United States Patent [19]

Bruna

[11] 4,453,045

[45] Jun. 5, 1984

[54] SUPPORTING ARRANGEMENT FOR ELECTROACOUSTIC TRANSDUCERS

[75] Inventor: Bernhard Bruna, Vienna, Austria

[73] Assignee: AKG Akustische u. Kino-Gerate Gesellschaft m.b.H., Austria

[21] Appl. No.: 418,972

[22] Filed: Sep. 16, 1982

[30] Foreign Application Priority Data

Sep. 24, 1981 [AT] Austria ................................ 4105/81

[51] Int. Cl.³ .............................................. H04M 1/04

[52] U.S. Cl. ................................ 179/146 R; 179/178; 179/180; 339/DIG. 3

[58] Field of Search ............... 179/184, 186, 180, 179, 179/178, 121 R; 367/173, 188; 339/DIG. 3

[56] References Cited

U.S. PATENT DOCUMENTS 3,692,264 9/1972 Burkhard ........................ 179/146 R
3,766,333 10/1973 Watson ........................... 179/146 R
3,947,646 3/1976 Saito ............................... 179/146 R

FOREIGN PATENT DOCUMENTS 1193104 5/1965 Fed. Rep. of Germany ... 179/146 R

*Primary Examiner*—Harold I. Pitts
*Assistant Examiner*—L. C. Schroeder
*Attorney, Agent, or Firm*—McGlew and Tuttle

[57] ABSTRACT

An arrangement for supporting electroacoustic transducers such as a microphone within a housing comprises a housing casing with a transducer within the casing supported by at least one elastic support ring provided between the transducer and the casing. The supporting ring is made of electrically conducting material providing electrical connection means to the housing. The housing itself or a portion thereof provides electrical terminal means for connecting the electrical transducer to an energy source.

5 Claims, 3 Drawing Figures

SUPPORTING ARRANGEMENT FOR ELECTROACOUSTIC TRANSDUCERS

FIELD AND BACKGROUND OF THE INVENTION

This invention relates in general to microphones and in particular to a new and useful apparatus for supporting a microphone within a housing.

Arrangements for elastically supporting electroacoustic transducers in a housing are known. Their purpose is to keep shocks, friction noises, noises originating in the movements of the connecting cable, etc. transmitted during the handling of a microphone to the housing thereof, away from the transducer which might convert them into disturbing voltage variations. Prior art elastic supports are satisfactory to a large extent. However, they are not capable of eliminating certain mechanical disturbances occurring within the housing. That is, the terminals of the electroacoustic transducer must be connected to the cable which is secured to the microphone housing through conductors which are embodied by stranded wires. As the housing is moved out and as these movements are usually shocks, even if very small ones, the stranded wires necessarily execute movement too, since the relative position of the transducer within the housing continues to vary. The result of the mutual motion of the stranded wires is that the capacity therebetween also varies, so that if a capacitive transducer is concerned, disturbing low-frequency voltage is produced in addition to the transducer signal, which disturbance is known as a "whirr of wires". To eliminate this disturbance attempts have been made to minimize the length of the wires. The effect of such a provision is questionable and in addition, with stronger shocks, the thin wires of the strand do not stand the occurring tensions and break. Also, a careful soldering is needed for securing the stranded wire ends to the transducer in the housing since otherwise the solder is taken by capillary action into the strand which is thereby stiffened which is a further disadvantage.

SUMMARY OF THE INVENTION

The invention is directed to an elastic support by which even disturbance sources present within microphone housings are eliminated.

in accordance with the invention, it is provided that a transducer or microphone be supported by one or more resilient and conductive rings disposed between the transducer and the housing and electrically connecting the transducer to terminals on the outside of the housing. With the invention there is no need for any soldering which is indespensible with wire or strand wire connections. The assembly is thereby made considerably easier and is less expensive to make. Further, the "whirr of wires" known in stranded wire connections is completely eliminated since no wires are employed.

A development of the invention provides silicone rubber as the electrically conducting material, having an electrical resistivity of about 0.5 Ohms. cm. This material is particularly advantageous for the inventive design since with a proper shaping of the elastic portions of the support, the total resistance between the transducer connection and the housing contact can be lowered to a practically insignificant level as compared to the internal resistance of the transducer, so that the ohmic losses resulting therefrom remain negligible.

It has also been found that butyl rubber or bromobutyl rubber is an advantageous material for the elastic element of the inventive support. This material has a frequency-dependent internal friction which decreases with the increasing frequency. For example, between 20 and 200 hz, the friction is considerable and decreases progressively with the increasing frequency. Such a frequency-dependent friction produces the effect that within its resonant range, which is intentionally provided in the low-frequencies, the oscillatory system formed by the elastic support and the mass of the electracoustic transducer is damped so strongly that the sound transmission between housing and transducer is well reduced, while at higher frequencies, the friction is still sufficient to substantially prevent a transmission of mechanical oscillations from the housing to the transducer.

Accordingly it is an object of the invention to provide an apparatus such as a microphone which comprises an outer housing so formed with an electroacoustic transducer supported within the housing by at least one elastic support ring which is engaged around the transducer and extends outwardly to the interior wall of the housing and which is made of an electrically conducting material.

A further object of the invention is to provide a microphone which is simple in design, rugged in construction and economical to manufacture.

The various features of novelty which characterize the invention are pointed out with particularity in the claims annexed to and forming part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 2:
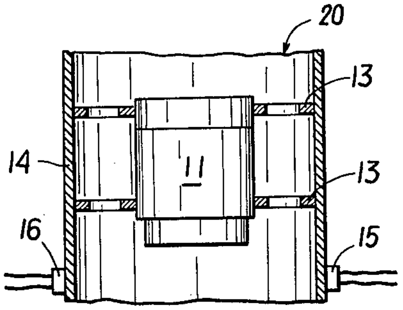
FIG. 2 is an axial sectional view of a housing elastically supporting an electroacoustic transducer in the inventive manner.
Figure 3:
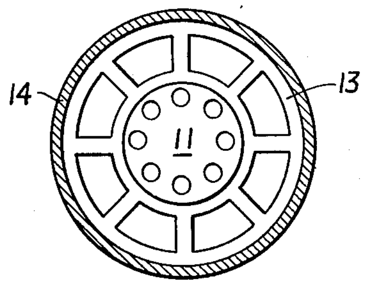
FIG. 3 is a horizontal sectional view from the speech side of the microphone housing shown in FIG. 2.

Referring to the drawings in particular the invention embodied therein is shown in FIGS. 2 and 3 and it comprises a microphone generally designated 20 which includes an electroacoustic transducer 11 of cylindrical form which is centered within a cylindrical casing or housing 14 and supported by elastic supports of conducting material 13. The arrangement preferably includes two elastic support rings 13 which include a portion at least made of electrically conductive material and which provide an electrical connection of the transducer 11 to a terminal affixed directly to the housing or an exterior portion thereof, for example, terminals 15 and 16. The terminals 15 or 16 may be separately electrically connected through for example various portions of the electrically conducting ring elements 13.

Figure 1:
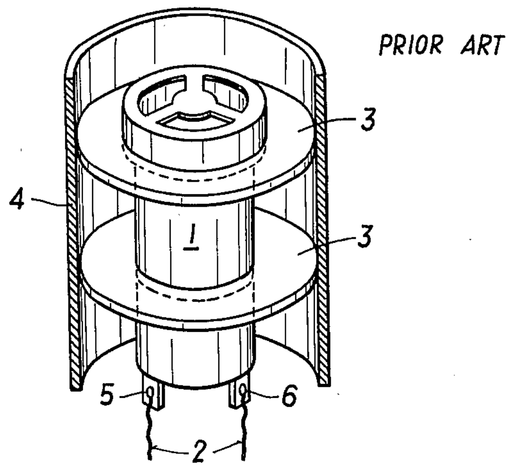
FIG. 1 is a perspective view showing the inside of a housing where an electroacoustic transducer is elastically supported in a well known manner.

FIG. 1 shows a prior art elastic support of a transducer 1 in a housing. The elastic supporting members 3 provided at the ends of the transducer 1 are annular in shape and surround the transducer and are in turn surrounded by the housing 4 to which they are secured and, which is mostly cylindrical. The connecting leads 5 and 6 of the transducer are embodied in this prior art construction by stranded wires 2 which are connected to fixed contacts provided on housing 4.

The invention starts from the same basic construction. The principal difference is that the electric connections of a transducer or microphone 11 (FIGS. 2 and 3) are not stranded wires or the like. These connections are embodied by supporting members 13 which are made of an electrically conducting material. Each supporting member 13 is advantageously in the shape of a spoked wheel and has a hub portion applying against the transducer and a rim applying against the transducer housing 14. The spokes of wheel-like supports 13 do by no means hinder the sound from passing therethrough and therefore do not affect the acoustic properties of the transducer 11. The electrical resistance of such a supporting member 13 is negligible too, as demonstrated by the following computation: Assume that 8 webs or spokes having each a length L of 5 mm and a cross-sectional area of 4 $mm^2$ are sufficient for securely supporting to the transducer. With a resistivity $\rho = 0.5$ Ohm. cm of the elastic material, and A being the total cross-section area of the webs, the total resistance would be $$R = \frac{\rho L}{A} = \frac{0.5 \times 0.5 \text{ Ohm cm}^2}{8 \times 0.04 \text{ cm}^2} = 0.78 \text{ Ohm}$$

It is evident that such a low resistance is of little importance in the microphone circuit.

The drawing does not show how the electrically conducting supports are connected to the microphone cable terminals or contacts 15 and 16 which are provided on the exterior of the housing 14. For example, with a metallic housing 14, the housing itself may be used as a conductor and define electrical terminal means together with exterior terminals 15 and 16' with one of the two terminals being insulated toward the housing. If the housing is made of a dielectric, such as a plastic, a suitable conducting path may be provided therein already during the manufacture.

While a specific embodiment of the invention has been shown and described in detail to illustrate the application of the principles of the invention, it will be understood that the invention may be embodied otherwise without departing from such principles.

What is claimed is:

1. An arrangement for supporting electroacoustic transducers in a preferably rotationally symmetrical housing, comprising at least one elastic support ring provided between the transducer and the housing being made of an electrically conducting material providing electrical connection to said housing, an electrical terminal means connected to the outside of the housing and through said ring to said transducer.

2. An arrangement according to claim 1, wherein the elastic material of said support ring comprises predominantly silicone rubber having an electrical resistivity of about 0.5 Ohms per cm.

3. An arrangement according to claim 1, wherein said elastic support ring comprises a butyl rubber and has an electrical resistivity of about 0.5 Ohms per cm. and a frequency dependent internal friction which decreases the increasing frequency.

4. A microphone comprising a cylindrical housing, a cylindrical transducer located within said housing and spaced from the interior thereof and an elastic ring supporting said transducer extending between said transducer and the housing and being of electrically conducting material and providing an electrical connection between said transducer to said housing.

5. A microphone according to claim 4, wherein said ring includes a plurality of radial extending spoke portions and including an inner hub ring portion surrounding said transducer and an outer ring portion engaged with said housing.

* * * * *